United States Patent

[11] 3,612,274

| [72] | Inventors | Edward D. Schmidt |
| | | St. Peter; |
| | | Morgan P. Camery, Le Sueur; John G. Martland, Le Sueur, all of Minn. |
| [21] | Appl. No. | 817,641 |
| [22] | Filed | Apr. 21, 1969 |
| [45] | Patented | Oct. 12, 1971 |
| [73] | Assignee | Green Giant Co. |

[54] PHOTOELECTRIC FOOD SORTING METHOD AND APPARATUS
10 Claims, 6 Drawing Figs.

[52] U.S. Cl............................................. 209/111.6, 250/223
[51] Int. Cl...................................................... B07c 5/342
[50] Field of Search.......................................... 209/111.6, 111.7, 75; 356/72, 73, 237; 250/223

[56] References Cited
UNITED STATES PATENTS

| 2,933,613 | 4/1960 | Powers | 209/111.6 X |
| 2,982,408 | 5/1961 | Blackborn et al. | 209/111.6 |
| 3,499,527 | 3/1970 | Badgley | 209/111.6 |
| 1,973,206 | 9/1934 | Hanson | 250/223 X |
| 3,430,055 | 2/1969 | Metzger | 356/237 X |

*Primary Examiner*—Allen N. Knowles
*Attorney*—Molinare, Allegretti, Newitt & Witcoff ABSTRACT: Food sorting of foods which display only minimal color variation between the grades which are to be distinguished from each other are sorted by simultaneously sensing more than one of the characteristics of the food. The food is illuminated with light and a reflected light beam is formed having an intensity which varies as a function of the size, color and texture of the food. The food is sorted directly in response to the variation of the intensity of the reflected light beam which is within a predetermined wavelength range, the food being accepted or rejected when the intensity within the given range is above or below a predetermined magnitude.

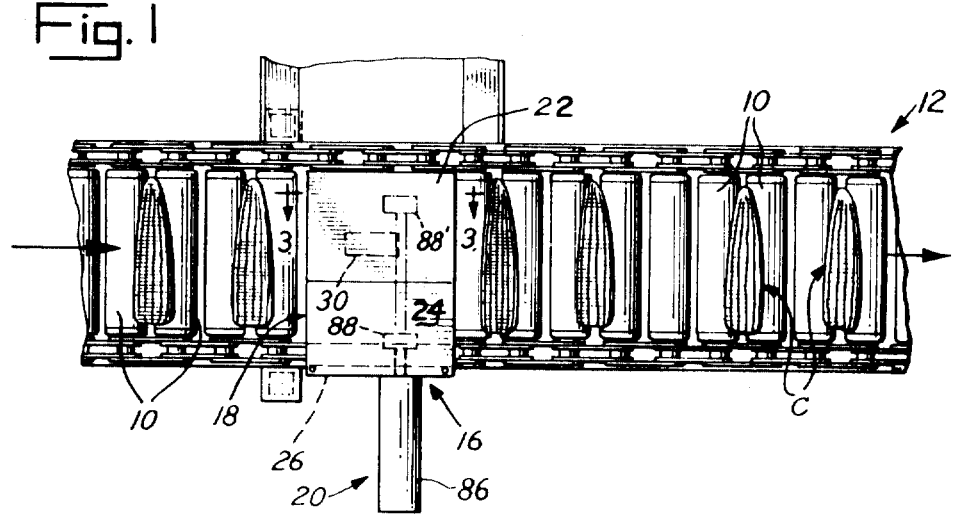
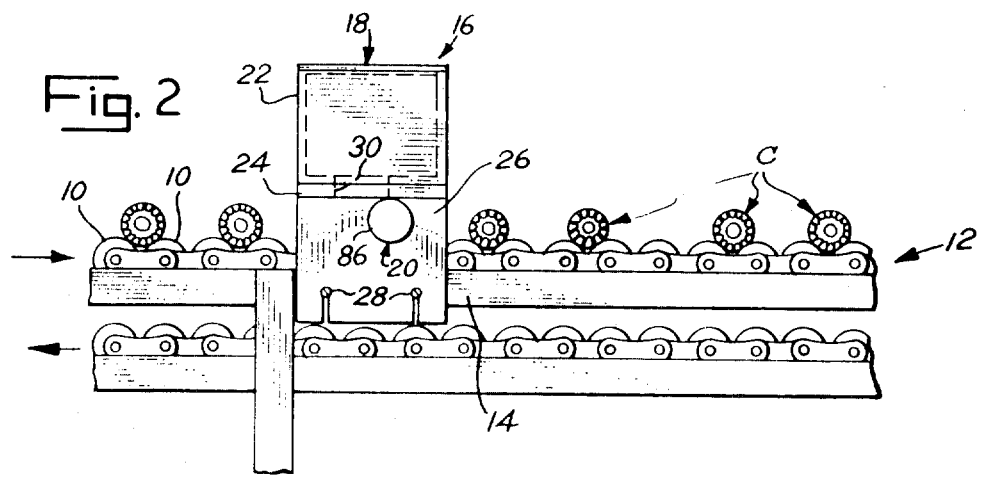
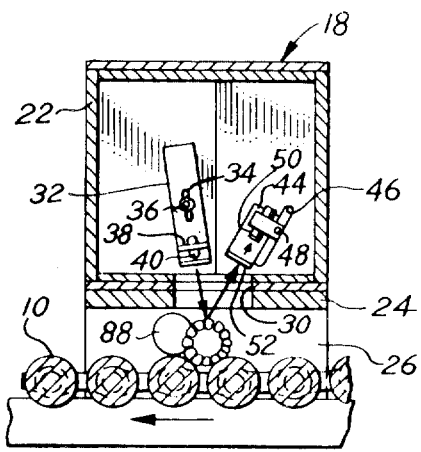
INVENTORS
EDWARD D. SCHMIDT,
MORGAN P. CAMERY &
BY JOHN G. MARTLAND
Bair, Freeman & Molinare
ATTORNEYS

INVENTORS
EDWARD D. SCHMIDT
BY MORGAN P. CAMERY &
JOHN G. MARTLAND

ATTORNEYS

PHOTOELECTRIC FOOD SORTING METHOD AND APPARATUS

BACKGROUND OF THE INVENTION

The present invention relates to food sorting and, more particularly, to the sorting of food according to maturity in response to the simultaneous sensing of more than one characteristic of the food.

Maturity sorting may be valuable not only in determining when a field should be harvested, but in the actual separation of immature and overmature foods during the preparation for market of the foods which have been harvested from a given field.

Photoelectric devices and methods have been employed in the past for the sorting of food according to maturity and quality. Such food-sorting methods have generally employed a light source which illuminates the food with light and the color of the light which is reflected from the surface of the food is measured to provide an indicia of the maturity of the food. The most usual characteristic of the food which is measured as an indicia of maturity is the color of the light which is reflected from the food. For example, where apples are to be graded according to maturity, the color of the light which is reflected from the surface of the apple will vary anywhere from predominantly green when the apple is immature to predominantly red when the apple has fully matured. Thus, as the apples become more fully mature, the intensity of the light in the red spectrum which is reflected from the apple will increase and will provide an indicia of the maturity of the apple which may be measured.

However, where the food which is desired to be sorted exhibits only a very small color change between immature and overmature or where the grades which are to be distinguished from each other display little if any color difference, the prior sorting techniques which relied on primarily color only are generally inadequate.

One food which exhibits only a small color change is corn. In addition, there are a number of factors or characteristics of the corn which enter into the determination of its quality. Some of these factors include the starch/sugar content, the color, the "chewiness," and the kernel size. In an immature ear of corn, the newly formed kernels are extremely tender and are composed primarily of a sugar solution. As the corn matures, the kernel increases in size, the skin, or pericarp, covering the kernel becomes somewhat thicker and tougher, and the sugar solution filling the pericarp is slowly transformed and changed to starch, the latter two factors tending to make the corn more "chewy." When the corn becomes overmature, the kernel size is quite large, the pericarp becomes quite tough and the material filling the pericarp of each kernel has substantially completely crystallized to starch.

As the maturity increases, the overall average quality of the corn also increases, although the quality of the corn as to certain factors might decrease. At a given point in the maturity of the corn, the average quality of the corn ceases its increase and falls off sharply due to an increase in percentage of overmature corn in the lot. The optimum point in time at which the corn should ideally be harvested, is at this point. At such point, the majority of the corn is not quite as tender as very immature corn, but has substantially increased in size relative to the immature stage without a substantial loss of tenderness. Since the color difference between corn of optimum maturity and the corn which is overmatured is minimal, the prior known color measurement techniques have been generally unsatisfactory to separate these grades from each other. Accordingly, the determination in the past of when to harvest a field of corn has been generally made by gathering and inspecting a few random samples taken from various points in the field. The samples are inspected visually and by kernel-weighing and starch-measuring techniques to determine the maturity of the sample, and the time at which the field is to be harvested is calculated therefrom. Obviously, such samples are, at most, only generally indicative of the condition, as a whole, of the corn in any given field. Upon harvesting the given field, it will be discovered that a major portion of the corn in the field will be of a desired maturity while a certain small fraction of the corn will be somewhat immature and another certain small fraction will be relatively overmature.

Since the fraction of overmature corn lowers the overall quality of the lot, a given field, in general, must be harvested at some point in time before the optimum point to insure that the overall average quality of the final prepared product is not of an inferior quality.

But if relatively immature ears could be allowed to ripen prior to harvest, a higher overall yield from the given field would be realized since during the course of ripening the size of the kernels and the weight of each ear increases. In addition, such early harvest not only results in a lower yield per acre, but inclement weather conditions, which might force a postponement of harvest to a later point in time, frequently necessitates the downgrading of the entire lot when the lot is able to be finally harvested, even though a considerable quality of corn of the desired maturity is present in the lot. Such longer ripening is now possible and the effects of delayed harvest due to inclement weather and the like are minimized by the method and apparatus of our invention which makes it possible to rapidly and effectively sort out and separate the overmature corn from that of proper maturity after harvesting. The food sorting method and apparatus employing the principles of our invention simultaneously senses more than one of the characteristics of the food by sensing the simultaneous effect of such characteristics as size, texture and color of the food on the intensity of light which is reflected from the food. The method and apparatus of our invention may be employed not only to supplement the visual sample inspection to determine the optimum point of time for harvest of a given field, but also may be employed after the corn has been harvested and during the processing of same for market to separate out those overmature ears which may randomly appear in the overall lot harvested from the particular field.

Also, an important feature of many of the prior photoelectric inspection and sorting systems is the provision of a fixed reference standard level of light wherein the intensity of the light reflected from the food or other material being sorted is compared against a reference light level to establish the sorting standard. Such fixed light reference standards frequently require the provision of a second photoelectric viewing cell, a complex arrangement involving light choppers or the like or complex comparison circuits. Other forms of prior devices have employed prisms and other elaborate optical devices for separating the light reflected from the food into two or more light beams of differing wavelengths which are electronically compared to determine the maturity of the food. Such light-separating systems inevitably necessitate the use of at least a pair of photoelectric cells for receiving each of the light beams.

In addition, photoelectric sorting methods and devices have been employed in the past to size grade foods either separately or in conjunction with color sorting. In general such methods and apparatus operate on the principle that the larger the food is, the more light will strike the food and be reflected therefrom. The overall amount of light which is reflected from the food is then measured to size grade the food. Again these apparatus and methods where food is to be size graded, either separately or in conjunction with color grading, employ separate independent measuring means to accomplish the color and size grading in separate independent steps and the apparatus is both complex and expensive.

The sorting method and apparatus of our invention obviates the need for separate light reference standards or plural differing wavelength light beams with their associated additional circuitry, plural photoelectric cells, prisms, and/or elaborate arrangements such as light choppers or the like.

Also in many of the prior photoelectric sorting devices, elaborate measures had to be taken to avoid false triggering by light reflected from mechanical conveyor elements. The device of our invention does not require such elaborate measures and provides a simple and effective solution to false triggering. Moreover, the food-sorting technique incorporating the principles of our invention is simultaneously responsive not only to the color of the food being sorted, but also other characteristics of the food including the size and the texture of the food, and thus is capable of substantially increased sensitivity and is capable of sorting foods between grades wherein the color differences are only minimal. The food-sorting technique of our invention sorts foods by sensing only a single light beam which is reflected from the food and which is within a predetermined wavelength range and thus only a single photoelectric cell need be provided. The food-sorting device may be rapidly and easily adjusted to sort foods according to varying maturities, if desired. Finally, the food-sorting device incorporating the principles of our invention is capable of use under production line conditions and is extremely rugged and reliable in operation, is inexpensive to construct, is compact, has low power requirements in operation, is easy to maintain even by relatively unskilled personnel, and yet is extremely sensitive and stable in operation.

SUMMARY OF THE INVENTION

In one principal aspect, the method employing the principles of our invention for sorting foods which display only minimal color variation comprises illuminating the food with light and forming a reflected light beam having an intensity which varies as a function of the simultaneous effect on the intensity by more than one of the foods characteristics. The intensity variation of the light beam within a predetermined wavelength range which is reflected from the food only is sensed, and first and second signals are generated when the last mentioned intensity varies to a magnitude which exceeds or is less than a predetermined magnitude respectively. The food is then sorted in response to said signals.

In another principal aspect, the apparatus for sorting foods which display only minimal color variation, and which incorporates the principles of our invention, includes a light source which illuminates the food with light and photoelectric means which is positioned to receive only light from the light source which is reflected from the food. A filter is positioned between the food and the photoelectric means for blocking substantially all the reflected light except light which is within a predetermined wavelength range. The photoelectric means generates a single variable output which is a function of the simultaneous effect on the reflected light within the predetermined wavelength range by more than one of the characteristics of the food. Trigger-sensing means, which is responsive to the single variable output of the photoelectric means, generates first and second signals when the intensity of the light striking the photoelectric means exceeds or is less than a predetermined magnitude and means which is responsive to the signals sorts the food.

These and other objects, features and advantages of the invention will become evident upon consideration of the following detailed description.

BRIEF DESCRIPTION OF THE DRAWINGS

In the course of this description, the drawings will frequently be referred to in which:

FIG. 1 is a plan view of the food-sorting device of our invention as installed on the conveyor of a food-processing line;

FIG. 2 is a side elevation view of the processing line of FIG. 1;

FIG. 3 is a cross-sectioned side elevation view of the food-sorting device of our invention taken substantially along line 3—3 of FIG. 1;

DESCRIPTION OF THE PREFERRED EMBODIMENT

Figure 4:
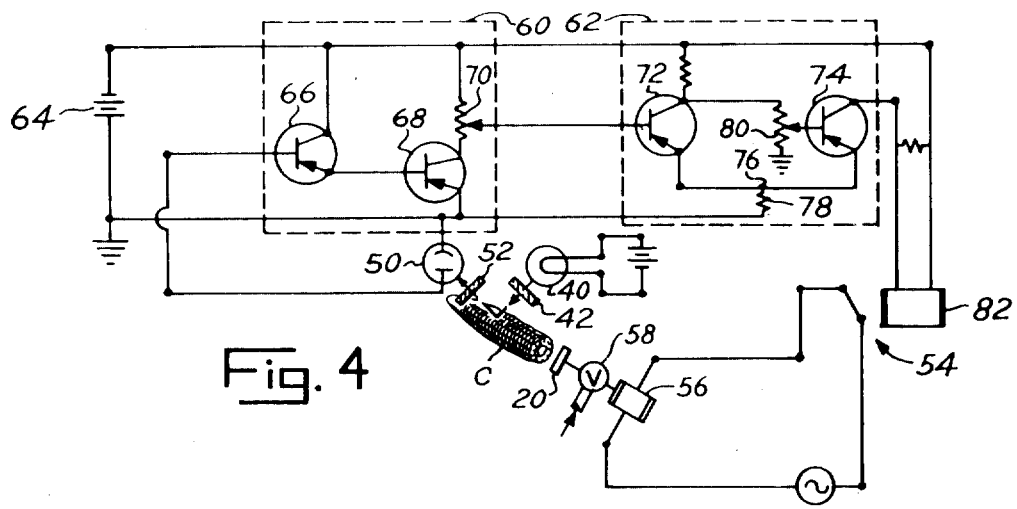
FIG. 4 is a schematic circuit diagram of the electronic sensing circuit of our invention.

Referring to FIGS. q and 2, a portion of a corn-processing line is shown, in which shucked ears of corn C are conveyed from left to right between adjacent rolls 10 of an appropriate conveyor 12. Mounted to the frame 14 of the conveyor, is a sorting assembly 16 which comprises a sensing assembly 18 and an ejection mechanism 20.

The sensing assembly 18 comprises a lighttight box 22 which is carried on a horizontal transverse platform 24 which overlies the conveyor and is spaced from the conveyor rollers 10 by a sufficient distance to allow the ears of corn C to pass beneath the box. The platform 24 includes a downwardly depending side 26 which is mounted by bolts 28 to the frame 14 of the conveyor such that the platform extends laterally over the conveyor. The side 26 is slotted to allow for vertical height adjustment of the platform. The platform 24 and the bottom of the box carry a slotted aperture 30 which is arranged in generally overlying relationship to the centerline of the conveyor 12 and which is of a size sufficient to allow light to pass from the box and light which is reflected from the corn to pass to the box, but which substantially prevents the entry of random light to the interior of the box.

Figure 5:
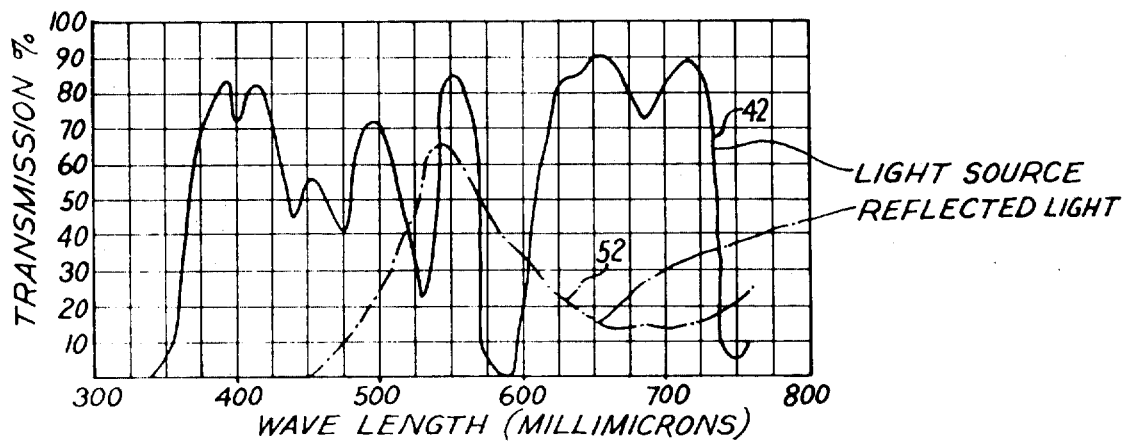
FIG. 5 is a plot of transmission percent v. wavelength of the light source and reflected-light filters employed in our invention.

Referring to FIG. 3, a light-source-mounting bracket 32 is provided in the box for mounting the light source of the sorting device. The bracket 32 is adjustably mounted by an elongated slot 34 and a bolt 36 on an interior wall of the box 22 and includes a flanged portion 38 upon which an illuminating lamp 40 is mounted. A light filter 42 is positioned between the lamp 40 and the slotted aperture 30 and is also carried by the bracket 32. The adjustable bracket permits adjustment of the lamp so the light may be directed through the aperture toward the ear of corn located therebeneath as viewed in FIG. 3. The lamp 40 is preferably of the white incandescent variety and, for example, may be a conventional automobile stop light lamp. Another bracket 44 is also adjustably mounted to an interior wall of the box 22 by a slot 46 and bolt 48. Mounting bracket 44 carries a photoelectric cell 50 and a filter 52 disposed between the slotted aperture 30 and photoelectric cell. The bracket 44 may also be adjusted to a position such that the photoelectric cell 50 receives the light beam reflected from the ear of corn beneath the aperture. The interior of the box 22 is preferably black to reduce reflection of scattered light beams within the box.

Where the food to be sorted is corn, filters 42 and 52 having the transmission characteristics shown in FIG. 5 have been found to produce extremely accurate sensitive results. Filter 42, which is located between the lamp 40 and the ear of corn, allows substantially unimpaired transmission of light in approximately the 530 to 575 millimicron wavelength range among others as shown in FIG. 5. A filter having such characteristics is available from Corning Glassworks as their didymium filter, Glass No. 5120. Thus, the light with which the corn is illuminated is primarily light of the aforementioned wavelength range. The filter 52, which is positioned between the corn and the photoelectric cell 50, is one which passes substantially only unimpaired light having a wavelength of between approximately 500 to 600 millimicrons. A filter having such characteristics is available also from Corning Glassworks as their green filter, Glass No. 4015. Therefore, the nature of the light which ultimately strikes the photoelectric cell 50 will not only be twice screened by the filters, but will also be effected by the reflective characteristics of the ear of corn itself.

Referring to FIG. 4, a sensing circuit is shown for sensing and distinguishing between the immature and mature corn and the overmature corn and initiating the ejection of an overmature ear. In general, the intensity of the reflected light in the aforementioned wavelength range increases as the corn matures due to the simultaneous effect produced by the various characteristics of the corn. When the intensity of the reflected light which strikes the photoelectric cell 50 exceeds a predetermined threshold magnitude, the relay contact indicated generally at 54 is actuated to operate an ejection solenoid 56 which, in turn, controls an air valve 58 admitting air to the ejection mechanism 20.

The circuitry for actuating the relay contacts 54 includes an amplifier circuit 60 and a trigger circuit 62. The input of the amplifier circuit 60 is connected to photocell or diode 50 and its output is connected to the input of the trigger circuit 62. Power for both the amplifier circuit and the trigger circuit is supplied by a DC voltage source 64 whose positive terminal is grounded.

The amplifier circuit 60 comprises a pair of direct-coupled transistors 66 and 68, the base of transistor 66 being connected directly to the cathode of the photocell 50 while the emitter of transistor 66 is connected directly to the base of transistor 68. The movable tap on potentiometer 70 adjusts the output level of amplifier 60.

The trigger circuit 62 comprises transistors 72 and 74, the emitters of which are connected together at a common point 76. The resistor 78, which connects the common point 76 with the positive terminal of source 64, accordingly forms a common emitter resistance. The base of transistor 74 is connected to the movable tap on a potentiometer 80 which is connected between the collector of transistor 72 and ground. The solenoid coil 82, which controls relay contacts 54, is connected between the collector of transistor 74 and ground.

Under normal conditions, transistors 66 and 68 in amplifier circuit 60 are conducting, thereby supplying the base of transistor 72 with a relatively positive voltage, holding transistor 72 off and transistor 74 on. As the intensity of light striking photocell 50 increases, transistors 66 and 68 become progressively less conductive, causing the voltage at the base of transistor 72 to grow increasingly negative. Eventually, at a predetermined threshold level, transistor 72 begins to conduct sufficiently that transistor 74 begins to turn off. At the same time, the decreased conduction through emitter resistance 78 forces the voltage at the emitter of transistor 72 to become more positive. This effect, being cumulative, causes transistor 74 to suddenly turn off while transistor 72 turns fully on.

By adjusting potentiometer 70, the threshold level of light necessary to actuate the relay contacts 54 may be adjustably varied. The amount of hysteresis exhibited by the trigger circuit 62 may be adjusted by altering the setting of the movable tap on potentiometer 80. The adjustable potentiometers enable the variation of the threshold-triggering level and thus enable sorting of the foods between various maturity grades as desired.

When the relay contact 54 is closed by the signal which is generated due to the passage of an overmature ear of corn beneath the slotted aperture 30, the ejection solenoid 56 is actuated opening air valve 58 to supply working air to the ejection mechanism 20.

Referring again to FIGS. 1 and 2, ejection assembly 20 is shown, by way of example, which is adapted to eject the overmature ears of corn in response to the signal generated by the sensing circuit. The assembly comprises an air cylinder 86 which is mounted upon the side 26 of the sensing assembly and which drives a piston 88 laterally across the conveyor. When an ear of corn is sensed to be overmature, air is admitted through valve 58 to rapidly drive the piston 88 across the conveyor to 88' pushing the ear of corn from the conveyor. When the piston has traversed the conveyor, the air is secured and the piston is quickly retracted in readiness for ejection of a subsequent overmature ear of corn. It should be appreciated that other well-known forms of ejectors may be employed to eject the corn from the conveyor. If the ejector is located in spaced relationship to the sensing assembly 18 and down line therefrom, a suitable delay may be included in the relay circuit to allow time for the triggering ear to arrive at the ejector.

The operation and principles underlying the operation of our invention will now be described in terms of sorting of corn. It will be appreciated that even though the invention is described in terms of corn, our invention may be employed in the sorting of other foods.

To commence the sorting operation, the conveyor 12 is set into motion and the individual rolls 10 each pass beneath the sorting assembly 16 from left to right as viewed in FIGS. 1 and 2. The lamp 40 and photoelectric sensing circuit are then energized and the corn to be sorted is introduced onto the conveyor. As the first ear of corn moves into position beneath the slotted aperture 30, it is momentarily illuminated with filtered light from the lamp 40, the light being predominantly within the wavelength range determined by the filter 42.

Figure 6:
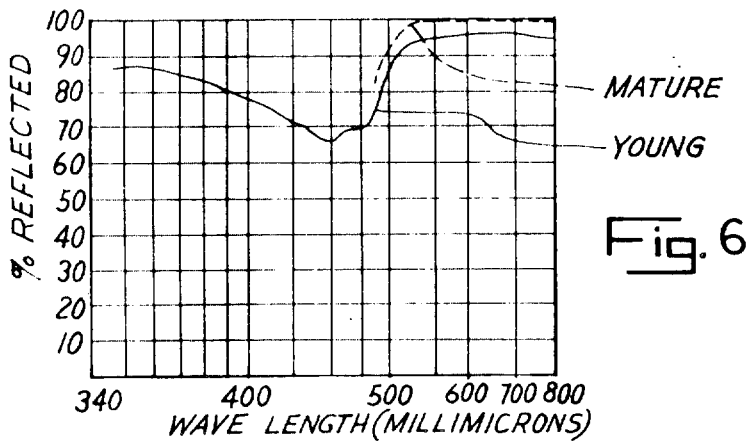
FIG. 6 is a plot of the percent reflected v. wavelength of the reflected light of both "young" and "mature" corn.

As the light strikes the ear of corn, a certain portion of the light will be reflected from the ear toward the photocell 50. The intensity of the reflected light, as a whole, will be affected by a number of variables including the kernel size of the corn, the cob diameter, the texture of the overall surface of the corn and the color of the corn. If the corn is immature, its kernel size will be small, as well as its cob diameter. The texture of the overall surface of the ear of corn will be somewhat coarse since the individual kernels are somewhat separated from each other in anticipation of growing to a larger size in the final fully matured ear of corn. Thus, the immature corn will be somewhat less reflective then fully matured corn in which the surface is more uniform. On the other hand, the skin of the individual kernels presents a very smooth reflective surface. In fact, in very immature corn, the kernel skin, or pericarp, is somewhat transparent and the interior of the kernel is filled primarily with liquid sugar solution and these kernels tend to be highly reflective. The color of the immature corn is also generally less yellow than that of mature corn. Since the kernel size and cob diameter is smaller than the more mature ear of corn, the distance through which the light must traverse between the lamp 40 to the photoelectric cell 50 is increased, thus tending to decrease the intensity of the light which strikes the photocell. Also, when the corn is immature, the amount of light in the desired wavelength range which is reflected by the corn is reduced, as shown in FIG. 6. Each of these effects combine to produce a net intensity of the light within the desired wavelength range and which strikes the photoelectric cell which is less than the threshold intensity needed to trigger the sensing circuit.

As the corn becomes more mature, both the kernel size and cob diameter increase and the texture of the overall surface becomes smoother, each tending to increase the reflectivity of the corn. Also a higher percentage of light within the desired wavelength range is reflected by the more mature corn as shown in FIG. 6. On the other hand, the pericarp of the individual kernels becomes more hazy due to the increase in thickness of the pericarp as well as the conversion of the sugar solution to a more granular form of starch within the pericarp of the individual kernels. The overall effect of such changes results in an increase in the intensity of the light reflected by the corn in the aforementioned wavelength range. When the intensity of the light which strikes the photocell 50 has increased to a point which is above the threshold intensity, the sorting circuit triggers to operate the ejection assembly 20 to eject the overmature ear of corn.

In order to prevent undesirable triggering of the sensing circuit due to reflection of the usually shiny rolls 10 of the conveyor, the slot 30 is selected to be of a predetermined size and is positioned above the rolls by such a distance that the path of the light reflected from the rolls does not enter the slot and therefore does not activate the photocell 50.

It will be readily understood that although the sensing circuit has been described in combination with an ejection mechanism, other mechanisms may be utilized with out invention. For example, where it is desired to sample a field for maturity, a counter may be employed for indicating the number of samples of a given maturity that are present in the field sample.

It should also be understood that the embodiment of the invention which has been described is merely illustrative of one application of the principles of the invention. Numerous modifications may be made by those skilled in the art without departing from the true spirit and scope of the invention.

What is claimed is

1. A method of sorting foods which display only minimal color variation between the grades which are to be distinguished from each other by simultaneously sensing more than one of the food's characteristics, said sorting method comprising:

illuminating the food with light and reflecting a portion of said light from the surface of a successive plurality of articles of the food, the intensity of the reflected light varying between the individual articles of food as a function of the simultaneous effect on the intensity by at least two of the food's characteristics including the size, the color and the texture of the food, whereby a reflected light beam of variable intensity is produced, sensing the intensity variation produced by at least two of said characteristics within a predetermined wavelength range of said variable intensity light beam which is reflected substantially only from the articles of said food, generating a first signal in response to said last-mentioned intensity when said last-mentioned intensity varies to a magnitude which exceeds a predetermined magnitude and a second signal in response to said last-mentioned intensity when said last-mentioned intensity is less than said predetermined magnitude, and sorting the individual articles of the food from each other in response to said first and second signals, whereby the individual articles of food are sorted by simultaneously sensing more then one of the characteristics of the food.

2. The method of claim 1 wherein said predetermined wavelength range is defined by filtering the light beam reflected from the food.

3. The method of claim 2 wherein said predetermined wavelength range is also defined by illuminating the food with light of a given wavelength range.

4. The method of claim 1 wherein the food is corn and the light illuminates individual successive cobs of said corn, and said intensity of the reflected light beam within said predetermined wavelength range is simultaneously varied as a function of the cob diameter, kernel size, kernel color and texture of the surface of the corn.

5. The method of claim 1 wherein the food is corn and said predetermined wavelength range of the reflected light waves is between approximately 500 and 600 millimicrons.

6. Apparatus for sorting foods which display only minimal color variation between the grades which are to be distinguished from each other in response to the simultaneous effect by more than one of the characteristics of the food on the intensity of light which is reflected from the surface of the food, and which includes a light source arranged to illuminate the food and photoelectric means for receiving the light from said light source which is reflected from the food, said apparatus comprising in combination therewith:

means positioning the photoelectric means so as to receive substantially only the light from the light source which is reflected from the food, filter means between the food and the photoelectric means for blocking the passage of substantially all of said reflected light to said photoelectric means except said reflected light which is substantially within a given predetermined wavelength range, said photoelectric means generating a single variable output which varies as a function of the simultaneous effect on the intensity of the reflected light within said given predetermined wavelength range by at least two of the characteristics of the food including the size, the color and the texture of the food, trigger-sensing means responsive to the single variable output of said photoelectric means to generate a first signal when the intensity of said reflected light within said predetermined wavelength range is increased by the simultaneous effect of said food characteristics to exceed a predetermined magnitude and a second signal when the intensity of said reflected light within said predetermined wavelength range is less than said predetermined magnitude, and means responsive to said signals for sorting the food, whereby the food is sorted by simultaneously sensing more than one of the food's characteristics.

7. The apparatus of claim 6 wherein said light source emits light of a predominant given wavelength range.

8. The apparatus of claim 7 wherein said light source includes a lamp and a filter between the lamp and the food for determining the wavelength range of the light which illuminates the food.

9. The apparatus of claim 6 wherein the predetermined wavelength range is between approximately 500 and 600 millimicrons.

10. The apparatus of claim 6 wherein said trigger-sensing means includes means for selectively varying the magnitude at which said first and second signals are generated.